Feb. 3, 1942.   L. SAIVES   2,272,024
APPARATUS FOR BUTT WELDING METAL SHEETS
Filed June 11, 1940
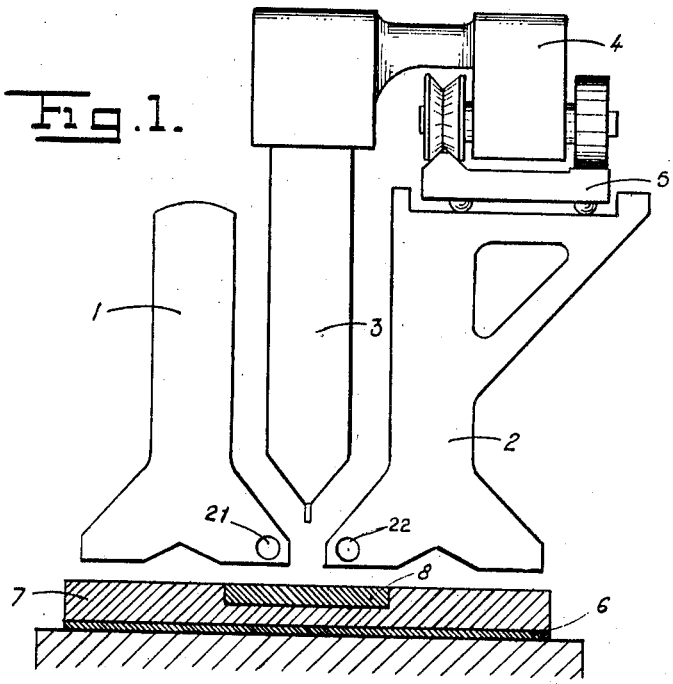
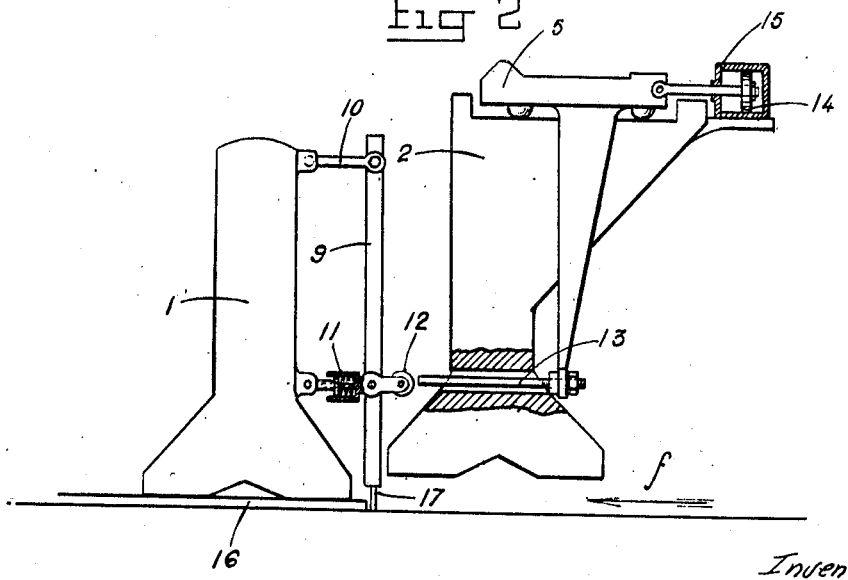
Inventor,
L. Saives
By: Glascock Downing & Seebold
Attys.

Patented Feb. 3, 1942

2,272,024

UNITED STATES PATENT OFFICE 2,272,024

APPARATUS FOR BUTT WELDING METAL SHEETS

Léon Saives, Billancourt, France, assignor to Société Anonyme dite: Societe des Aciers Fins de l'Est, Billancourt, France, a corporation of France Application June 11, 1940, Serial No. 339,982
In France June 26, 1939

3 Claims. (Cl. 219—8)

The present invention relates to apparatus for butt-welding the ends of metal sheets.

It is desirable in the case of metal sheets which are to be cold rolled, to employ rolls made up of sheets which are as long as possible and are formed by butt-welding hot-rolled rough sheets. The invention relates to improvements in such apparatus employed for this butt welding of the sheets and is designed principally for rendering the welding operation completely automatic in order that the welding effected will not depend upon the manual skill of the workmen engaged therein.

The welding is effected by employing an electric welding head having a carbon or metal electrode. This head, which is of a normal type, in particular automatically effects the maintenance of the electrode at a constant distance from the sheet and moves along the welding line at a constant or progressive speed.

According to the invention, the welding head is so mounted that the electrode moves exactly along the welding line without manual regulation, even if the shearing of the sheets has not been effected exactly perpendicularly to the axis of these sheets. For this purpose, the invention provides abutment members which bear against one of the two sheets to be welded and automatically determine the disposition of the rails over which moves the carriage carrying the welding head.

A constructional form of the invention is shown by way of example in the accompanying drawing, in which:

Figure 1 is an end elevation of the apparatus for the butt-welding of two sheets;

Figure 2 shows the additional devices providing for the adjustment of the rails along which the welding head moves.

The apparatus shown in Figure 1 includes two girders 1 and 2 serving to hold fast the sheets not shown. These rigid girders only have a vertical reciprocating movement of a few centimetres. Their locking arm, which consists of non-magnetic material in order to avoid possible distortion of the electric arc, is of symmetrical form so as not to set up any lateral thrust on the guides or the sheets. A non-magnetic plate 7 serves as a block for the two locking girders 1 and 2. This plate supports a brass plate 8, which is fitted therein and may be interchanged. The plate 7 may, if desired, bear against a plate 6 of plastic material which is intended to take up any uneven features of the sheets. The welding head 3 is arranged to move between the two locking girders 1 and 2 and is carried by a carriage 4 travelling on rails of a frame 5. As will hereinafter be explained, the invention provides automatic adjustment of the rails of this frame so that the carriage 4 will be guided parallel to the line along which the welding is to be effected.

The locking and unlocking of the girders 1 and 2 is effected by pistons operating under high pressure and transmitting their power either directly or through the intermediary of any desired multiplying system, while the locking power must be such that a sheet, even if deformed, is laid perfectly flat on the table 7. The feet of the locking girders, especially those situated on the welding side, may be cooled by a current of air passing through conduits 21 and 22 provided for this purpose.

One of the girders carries through the intermediary of articulated links 10 and 11, arms 9, each of which forms with the corresponding links 10 and 11 a deformable parallelogram. The link 11 preferably includes an elastic member permitting of reducing the length of this link. At their lower ends, the arms 9 are terminated by fingers 17 adapted to abut against the sheet 16 locked under the girder 1. The frame 5 carrying the rails is pushed towards the opposite girder 1 by the action of a piston 14 which is displaced in the cylinder 15. Fixed on this frame 5 are bars 13 adapted to abut against rollers 12 carried by the deformable parallelograms, for example at the extremities of the links 11.

The normal cycle of operations for welding two sheets end-to-end is as follows: the first sheet 16 or the assembly of several sheets already welded is engaged under the locking girder 1, so that the future welding line extends entirely between the feet of the girders 1 and 2, whereupon the girder 1 is locked. The two arms 9 situated symmetrically with respect to the longitudinal axis of the sheets are then lowered and the frame 5 is displaced by the movement of the piston 14 towards the girder 1 so that the ends 17 of the arms 9 are forced by the bars 13 against the extremity of the sheet 16 after a compression of the elastic elements of the links 11. The frame 5 is then held fast in the position taken and at this instant the rails of the frame 5 are parallel to the edge of the sheet 16, so that the welding line will extend evenly along this edge. When the frame 5 has been made fast, the arms 9 are raised and the second sheet is moved in the direction of the arrow f until its edge touches the edge of the sheet already in position. The girder 2 is then locked and the welding proceeded with.

After the welding, the girder 2 is first raised and the girder 1 is also raised. The frame 5 is then moved to the right into the inoperative position by reverse movement of the piston 14. The apparatus is thus ready for effecting a further welding.

It will be understood that the constructional example described in the foregoing and shown in Figs. 1 and 2 is in no way limitative and that various modifications can be made without departing from the invention.

I claim:

1. In apparatus for butt-welding the ends of metal sheets, a girder member for holding one sheet to be welded in a fixed position, fingers movably supported on said girder member for engaging the edge of said sheet, a second girder member for holding another metal sheet with the edge thereof adjacent the edge of the first sheet, a frame movable on the second girder member, rails carried by said frame, a welding head depending between the girder members adjacent the edges of said sheets and mounted for movement on said rails, and rigid means carried by the frame for engaging said fingers to position said rails in alignment with the edge of the sheet to be welded.

2. In apparatus for butt-welding the ends of metal sheets, a girder member for holding one sheet to be welded in a fixed position, fingers movably supported on said girder in positions for engaging the edge of said sheet, a second girder member for holding another sheet with the edge thereof adjacent the edge of the first sheet, a frame movable on said second girder member, rails carried by said frame and substantially parallel with respect to the first sheet, a welding head depending between the girder members adjacent the edges of said sheets and mounted for movement on said rails, bars carried by the frame positioned for engaging said fingers, and means for moving said frame on the second girder member to move the bars into engagement with the fingers and move the fingers into engagement with the edge of the first sheet whereby said rails are aligned with the edge of the first sheet.

3. In apparatus for butt-welding the ends of metal sheets, a girder member holding one sheet to be welded in a fixed position, a plurality of fingers, links including yieldable means supporting said fingers on said girder member, a second girder member for holding another sheet with the edge thereof adjacent the first sheet, a frame movably mounted on the second girder member, rails carried by said frame extending substantially parallel with respect to the edge of the first sheet, a welding head depending between the girder members terminating adjacent the edges of said sheets and mounted for movement on said rails, rigid means carried by the frame for moving said fingers into engagement with the edge of the first sheet so as to position the rails parallel with the edge of the first sheet.

LÉON SAIVES.